United States Patent
Aino (10) Patent No.: US 6,480,940 B1
(45) Date of Patent: Nov. 12, 2002

(54) METHOD OF CONTROLLING CACHE MEMORY IN MULTIPROCESSOR SYSTEM AND THE MULTIPROCESSOR SYSTEM BASED ON DETECTION OF PREDETERMINED SOFTWARE MODULE

(75) Inventor: Shigeyuki Aino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/429,329

(22) Filed: Oct. 28, 1999

(30) Foreign Application Priority Data

Oct. 30, 1998  (JP) ............................................ 10-326050

(51) Int. Cl.[7] ............................................. G06F 12/00
(52) U.S. Cl. ............................. 711/141; 711/147; 711/3
(58) Field of Search ................................. 711/141, 142, 711/143, 144, 145, 146, 128, 119, 120, 121, 125, 3, 208, 147

(56) References Cited

U.S. PATENT DOCUMENTS

| | | | |
|---|---|---|---|
| 5,091,846 A | * 2/1992 | Sachs et al. ................. 711/130 |
| 5,140,681 A | * 8/1992 | Uchiyama et al. .......... 711/134 |
| 5,287,484 A | * 2/1994 | Nishii et al. ................. 711/144 |
| 5,325,504 A | * 6/1994 | Tipley et al. ................ 711/128 |
| 5,345,571 A | 9/1994 | Morisada .................... 395/375 |
| 5,353,428 A | 10/1994 | Shibata ....................... 395/425 |
| 5,379,276 A | * 1/1995 | Igami et al. .................. 369/32 |
| 5,469,555 A | * 11/1995 | Ghosh et al. ............... 711/133 |
| 5,524,234 A | * 6/1996 | Martinez, Jr. et al. ...... 711/141 |
| 5,555,398 A | * 9/1996 | Raman ........................ 711/143 |
| 5,561,783 A | * 10/1996 | Vanka et al. ................ 711/141 |
| 5,664,149 A | * 9/1997 | Martinez, Jr. et al. ...... 711/141 |

FOREIGN PATENT DOCUMENTS

| | | |
|---|---|---|
| EP | 0 343 567 | 11/1989 |
| JP | 54-48129 | 4/1979 |
| JP | 63-223849 | 9/1988 |
| JP | 2-226449 | 9/1990 |
| JP | 3-40046 | 2/1991 |
| JP | 3-210645 | 9/1991 |

OTHER PUBLICATIONS

Jim Handy, "The Cache Memory Book", Academic Press, pp60–64, 1993.*

* cited by examiner

Primary Examiner—Hong Kim
(74) Attorney, Agent, or Firm—McGinn & Gibb, PLLC (57) ABSTRACT

Cache control protocols can be switched during running without changing an architecture for a segment descriptor or page descriptor for indicating an attribute of an area to be accessed. A plurality of processors each including a cache memory constitute a multiprocessor system which shares a main memory via a system bus. Each processor has module detecting means for detecting execution of a module which accesses a shared memory area on the main memory, by comparing the virtual space number and the instruction segment number concerning the accessing module with those numbers concerning the software modules preset which may access the shared memory area. Memory access executed in a module detected by the module detecting means is controlled in a cache control protocol of a store-through scheme which updates a main memory simultaneously with update of a cache memory. Memory access executed in other modules is controlled in a cache control protocol of a store-in scheme which does not update a main memory at update of a cache memory.

2 Claims, 5 Drawing Sheets

METHOD OF CONTROLLING CACHE MEMORY IN MULTIPROCESSOR SYSTEM AND THE MULTIPROCESSOR SYSTEM BASED ON DETECTION OF PREDETERMINED SOFTWARE MODULE

BACKGROUND OF THE INVENTION

1. Field of the Invention

The present invention relates to control of a cache memory in a multiprocessor system, and more particularly to switching of cache control protocols.

2. Description of the Related Art

Conventionally, two kinds of cache control protocols have been used in a multiprocessor system. One is a store-in scheme in which only data in a cache memory is updated at a data update and the updated data is reflected in a main memory when a pertinent data portion in the cache memory is written back to the main memory. The other is a store-through scheme in which updated data is also reflected in a main memory simultaneously with reflection of the updated data in a cache memory at a data update.

Under a multiprocessor environment, the store-in scheme requires only a few number of accesses to a main memory since the updated data is reflected only in a cache at the data update. However, when another processor intends to update data in the same data area as that of the updated data, the data update is performed after the data in the data area is written back from a cache having that the newest updated data and transferred to a cache held by the other processor. As a result, data is frequently transferred among caches at update of a main memory area shared among a plurality of processors, which causes deteriorated performance.

On the other hand, in the store-through scheme, since the data update is reflected not only in a cache in a processor concerned but also in a main memory at each data update, the number of accesses to a main memory is significantly increased under a multiprocessor environment. This leads to a delay in response to memory access and thus deteriorated performance.

In view of these circumstances, a multiprocessor system has been proposed which switches during running a cache control protocol of the store-through scheme which updates a main memory simultaneously with the update of a cache memory and a cache control protocol of the store-in scheme which does not update a main memory at the update of a cache memory to each other.

For example, in JP-2-226449A and JP-3-210645A, each page in a main memory is provided with a flag for indicating whether the page is shared among a plurality of processors such that the store-through scheme is employed at an access to shared pages and the store-in scheme is employed at an access to other pages. Additionally, in JP-3-40046A, each page or each segment in a memory is provided with a descriptor for indicating a store-in or store-through attribute such that a cache control protocol is switched during running between the store-through scheme and the store-in scheme depending on the descriptor of the accessed page or segment.

According to the aforementioned prior arts, drawbacks can be overcome for each of the store-in and store-through schemes. Specifically, it is possible to suppress moves of data for a shared memory area among caches while the number of accesses to a main memory is reduced under a multiprocessor environment, thereby allowing improvement in performance.

However, any of the prior arts switches cache control protocols on the basis of an area to be accessed. When cache control protocols are switched on the basis of the area to be accessed, there exists a problem that an architecture requires change which causes incompatibility with conventional devices. Specifically, when cache control protocols are changed on the basis of the area to be accessed, as described in each of the aforementioned official gazettes, it is required that a segment descriptor or page descriptor is used to indicate an attribute of the area to be accessed or a flag is added for discriminating between the store-in scheme and store-through scheme. However, since and the segment descriptor or the like is defined in terms of structure by an architecture, causing the need for change of the architecture itself occurs.

SUMMARY OF THE INVENTION

It is thus an object of the present invention to provide a method of controlling a cache memory capable of switching during running cache control protocols without changing an architecture for a segment descriptor or page descriptor for indicating an attribute of an area to be accessed, and an apparatus therefor.

A method of controlling a cache memory in a multiprocessor system according to the present invention detects whether a software module which accesses stored data via a cache memory matches the software module preset as one which accesses a shared memory area on a main memory, and switches cache control protocols depending on the detection result. Specifically, control is performed in a store-through scheme cache control protocol which updates the main memory simultaneously with the update of the cache memory when the software modules is a software module which accesses the shared memory area on the main memory, otherwise control is performed in a store-in scheme cache control protocol which does not update the main memory at the update of the cache memory.

The multiprocessor system of the present invention is characterized in that it comprises, in each processor, module detecting means for detecting execution of a in a software module to access a shared memory area on a main memory, and means for controlling memory access executed in a software module detected by the module detecting means in the store-through scheme cache control protocol or for controlling memory access in other than the aforementioned case in the store-in scheme cache control protocol.

In this manner, the cache control protocols are switched by detecting whether a software module which attempts to access stored data is a preset software module for accessing a shared memory area on a main memory, thereby allowing switching of the cache control protocols during running without changing an architecture for a segment descriptor or page descriptor for indicating an attribute of an area to be accessed.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Next, an embodiment of the present invention will be described in detail with reference to the drawings.

Figure 1:
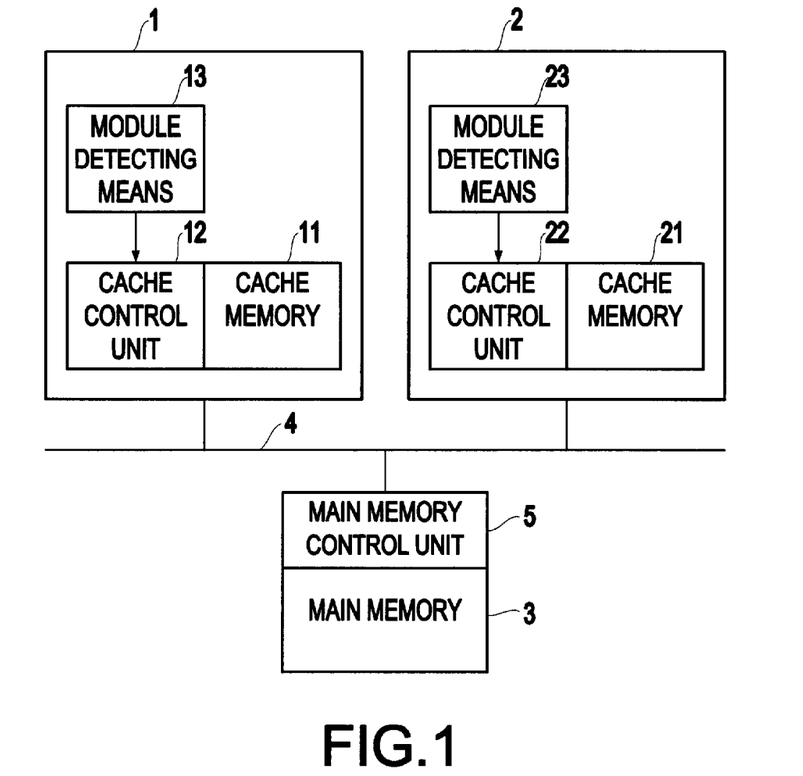
FIG. 1 is a block diagram showing an example of a multiprocessor system to which the present invention is applied.

FIG. 1 is a block diagram showing an example of a multiprocessor system to which the present invention is applied. In the multiprocessor system in the example, two processors 1, 2 share single main memory 3 via system bus 4 and main memory control unit 5. It should be noted that although the example shows two processors, the present invention is applicable to a multiprocessor system in which a main memory is shared among three or more processors.

Processors 1, 2 comprise, in addition to respective operational units or the like not shown, cache memories 11, 21 each for holding a copy of a portion of data in main memory 3, cache control units 12, 22 for controlling cache memories 11, 21, and module detecting means 13, 23, respectively.

Figure 2:
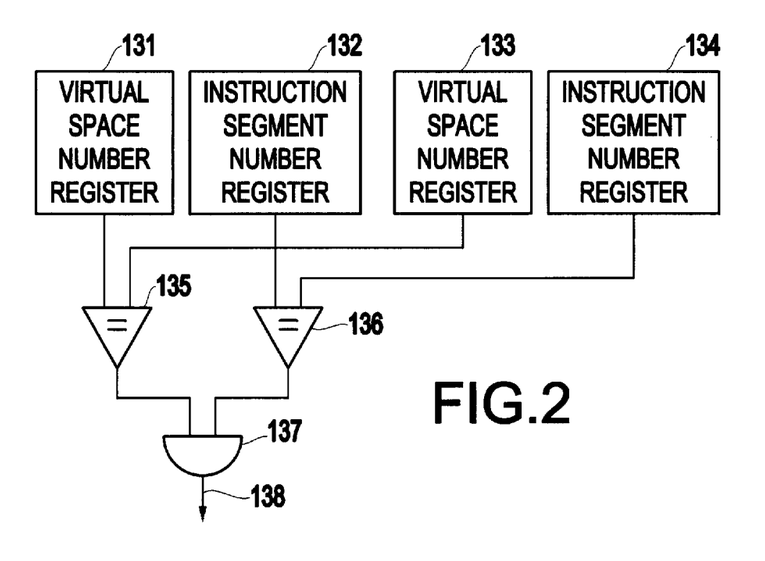
FIG. 2 is a block diagram showing an configuration example of module detecting means.

Module detecting means 13, 23 is means for detecting execution of a software module which makes access to a shared memory area on main memory 3. An example of the configuration of module detecting means 13 is shown in FIG. 2. Module detecting means 23 may have the similar configuration.

In FIG. 2, virtual space number register 131 is a register in which a virtual space number is set for the process which is making memory access in processor 1. Instruction segment number register 132 is a register in which a number of an instruction segment storing an instruction code for the module in the process under execution is set.

On the other hand, virtual space number register 133 is a register in which virtual space numbers are preset for all processes which can access the shared memory area on main memory 3. Instruction segment number register 134 is a register in which numbers of instruction segments storing instruction codes for modules in the processes which can access the shared memory area on main memory 3 are preset. These registers 133, 134 are software-visible registers for which a desired value can be set from outside with a software instruction.

A virtual space number in virtual space number register 131 is compared with each of virtual space numbers in virtual space number register 133 at comparator 135, while an instruction segment number in instruction segment number register 132 is compared with each of instruction segment numbers in instruction segment number register 134 at comparator 136. When matching is detected both at comparators 135, 136, i.e. when a module in the process which attempts to access a memory in processor 1 is a previously registered module which can access the shared memory area on main memory 3, cache control scheme directing bit 138 outputted from AND circuit 137 is logical one which directs a cache control protocol in the store-through scheme which updates the main memory simultaneously with the update of the cache memory, and when otherwise, cache control scheme directing bit 138 is logical zero which directs a cache control protocol in the store-in scheme which does not update the main memory at the update of the cache memory.

Upon a memory access request, cache control units 12, 22 respectively perform control with cache control protocol in the store-through scheme when cache control scheme directing bits 138 from module detecting means 13, 23 indicate logical one, or perform control with cache control protocol in the store-in scheme when cache control scheme directing bits 138 indicate logical zero.

Therefore, when only a specific module (for example, a system trace module) in an operating system (OS) accesses the shared memory area on main memory 3, the virtual space number of that specific module is preset in virtual space number register 133 and the number of the instruction segment storing the instruction code for that specific module in the OS is preset in instruction segment number register 134 such that memory access made in that specific module in the OS is controlled with the store-through scheme cache control protocol and memory access made in other modules (i.e. modules which do not access the shared memory area) is controlled with the store-in scheme cache control protocol.

The configuration in FIG. 2 can detect only one module which accesses the shared memory area on main memory 3. However, if N sets of virtual space number register 133, instruction segment number register 134, comparators 135, 136 and AND circuit 137 are provided and also an OR circuit is provided for ORing outputs from AND circuits 137 in respective sets, up to N modules which access the shared memory area on main memory 3 can be detected. Thus, it is possible to handle a case where a plurality of OS modules access a shared memory area. Additionally, although it is thought that a module which accesses the shared memory area is generally a specific module in an OS and an application job infrequently accesses the shared memory area, a module in the application job which accesses the shared memory area, if any, can be included in a target for detection.

It should be noted that although the aforementioned example detects which module in which process is being executed on the basis of the virtual space number and the instruction segment number, it is possible to detect running of a specific module in a specific process with a method other than the aforementioned one. For example, if only one virtual space exists, comparison of virtual space numbers may be omitted.

The cache control protocol in the store-through scheme may be any protocol as long as it updates the main memory simultaneously with the update of the cache memory. The cache control protocol in the store-through scheme may be any protocol as long as it does not update the main memory at the update of the cache memory. All of examples of the cache control protocols in the store-in scheme and store-through scheme as described below is a snoop cache method in which the cache itself actively maintains coherence with its cache control unit, i.e. a method in which each cache control unit monitors all access addresses to the main memory through a system bus and takes appropriate measures required to maintain coherence if an access address which may affect itself is detected. Additionally, in this method, when a mishit occurs in a cache and the newest data is not present in the main memory but in another cache, a copy of the data is sent directly from the cache holding the newest data to the cache in which mishit occurred by transfer procedures between caches and simultaneously the data is written back to the main memory.

Figure 3:
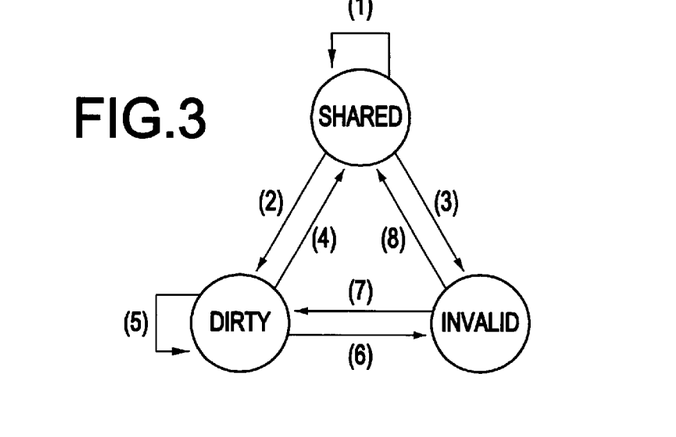
FIG. 3 is a state transition diagram showing a cache block in a store-in scheme cache control protocol.
Figure 4:
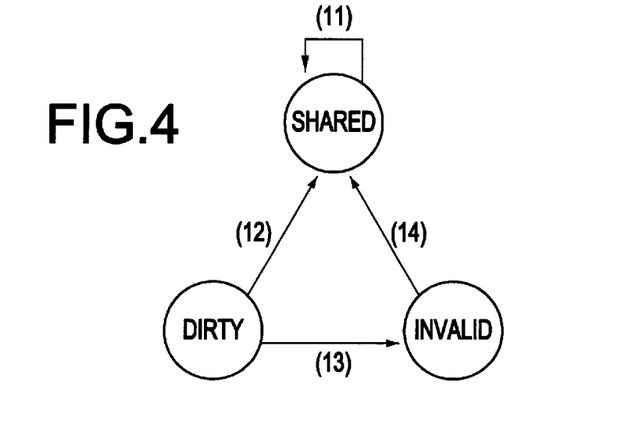
FIG. 4 is a state transition diagram showing a cache block in a store-through scheme cache control protocol.

FIG. 3 and FIG. 4 are state transition diagrams for a cache block in such cache control protocols. FIG. 3 and FIG. 4 correspond to the store-in scheme and the store-through scheme, respectively. A cache block refers to a transfer unit between a main memory and a cache (for example, 64 bytes), and each cache block is represented in three states; the first is a state in which the main memory and the cache have the same data (this state is referred to as "Shared"), the second is a state in which only the cache concerned has the newest updated data (this state is referred to as "Dirty"), and the last is a state in which the cache concerned does not hold a pertinent cache block (this state is referred to as "Invalid"). Arrows in FIGS. 3 and 4 indicate that when access is made for a cache block as indicated with an arrow, a state of the cache block represented at the root of an arrow transitions to a state of the cache block represented at the point of the arrow. Specifically, state transition occurs in each cache control protocol as follows:

(A) Cache Control Protocol in Store-in Scheme (FIG. 3)

When a read request is issued from the processor concerned for a cache block in Invalid state, the newest value of a pertinent cache block is read from the main memory or the cache in the other processor, and transition occurs to Shared state ((8) in FIG. 3). When a write request is issued from the processor concerned for a cache block in Invalid state, the newest value of a pertinent cache block is read from the main memory or the cache in the other processor to update data, and transition occurs to Dirty state ((7) in FIG. 3).

When a read request is issued from the processor concerned for a cache block in Shared state, pertinent data is returned to the processor concerned and state transition does not occur ((1) in FIG. 3). In the case of a write request for a cache block in Share state, when the request is issued from the processor concerned, updated data is reflected only in its cache and state transitions to Dirty ((2) in FIG. 3) and when the request is issued from the other processor, the state of the cache block transitions to Invalid ((3) in FIG. 3).

When a request is issued from the processor concerned for a cache block in Dirty state, access is processed in its cache both for a read request and a write request, and state transition does not occur ((5) in FIG. 3). In the case of a read request from the other processor, the requested cache block is transferred to the cache in the requesting processor and to the main memory, and the state transitions to Shared ((4) in FIG. 3). In the case of a write request from the other processor, the requested cache block is written back to the cache in the requesting processor and to the main memory, and the state transitions to Invalid state ((6) in FIG. 3).

(B) Cache Control Protocol in Store-through Scheme (FIG. 4)

When a request is sent from the processor concerned for a cache block in Invalid state, both for a read request and a write request, the newest value of a pertinent cache block is read from the main memory or the cache in the other processor and stored in the cache and then data is accessed, and the state transitions to Shared ((14 in FIG. 4). In the case of a write request on this occasion, updated data is reflected in its cache and also in the main memory and the cache in the other processor.

When a request is sent from the processor concerned for a cache block in Shared state, both for a read request and a write request, a cache block in the cache is accessed and state transition does not occur ((11) in FIG. 4). In the case of a write request on this occasion, updated data is reflected in the cache and also in the main memory and the cache in the other processor. For a write request from the other processor, updated data sent from the other processor via the system bus is reflected in the cache and state transition does not occur ((11) in FIG. 4).

In a read request for a cache block in Dirty state, whether a request is issued by the processor concerned or the other processor, the requested cache block is transferred to the main memory and to the cache in the other processor which issued the request, the state transitions to Shared ((12) in FIG. 4). In the case of a write request issued by the processor concerned, the requested cache block is sent to the system bus, and the cache block in Dirty state is first reflected in the main memory to cause the state of the cache to transition to Shared. Next, updated data is reflected in the cache and the updated data is reflected in the main memory and the cache in the other processor via the system bus ((12) in FIG. 4). In the case of. a write request issued by the other processor, the requested cache block is written back to the main memory and to the cache in the other processor, and the state transitions to Invalid ((13) in FIG. 4).

Figure 5:
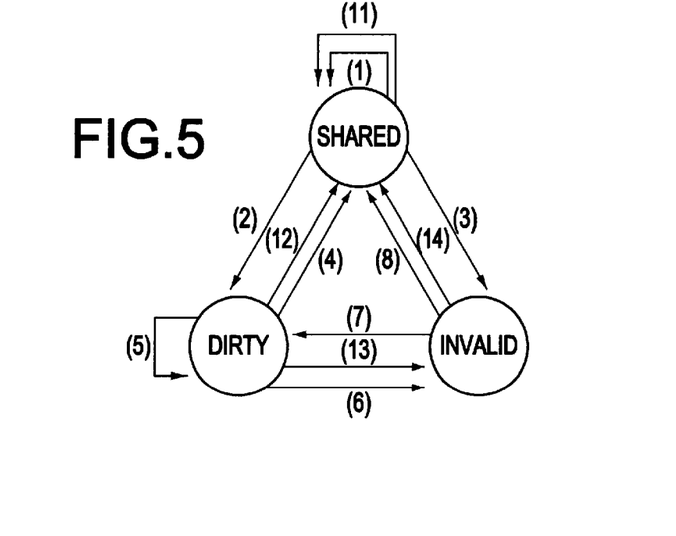
FIG. 5 is a state transition diagram formed by combining the state transition diagram of FIG. 4 with the state transition diagram of FIG. 3.

A state transition diagram for a cache block shown in FIG. 5 is formed by adding the state transition diagram in FIG. 4 to the state transition diagram in FIG. 3. When a switch is made during running between the store-in scheme cache control protocol in FIG. 3 and the store-through scheme cache control protocol in FIG. 4, the state of a cache block transitions as shown in FIG. 5. In the above descriptions, a request "in the store-in scheme" corresponds to a request with a cache control scheme directing bit being zero, while a request "in the store-through scheme" corresponds to a request with a cache control scheme directing bit being one.

Figure 6:
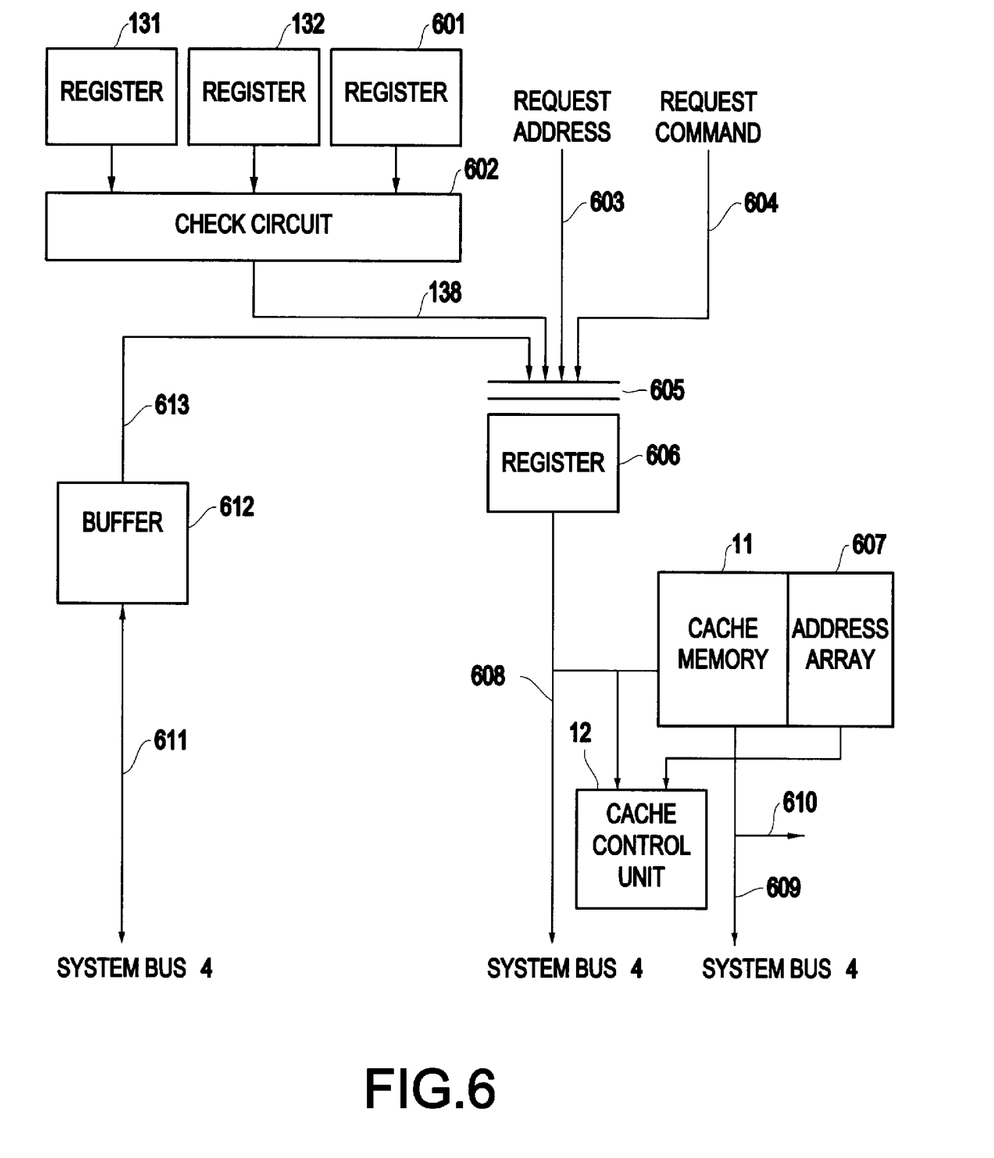
FIG. 6 is a block diagram showing a configuration example of hardware around a cache memory provided in a processor in an embodiment which employs the cache control protocols shown in FIG. 3 and FIG. 4.

FIG. 6 is a block diagram showing an example of a hardware configuration around a cache memory provided in processor 1 in an embodiment employing the cache control protocols shown in FIG. 3 and FIG. 4. Similar hardware is also provided in processor 2.

In FIG. 6, register 131 and register 132 correspond to registers 131, 132 in FIG. 2, respectively. Register 131 holds a virtual space number of a currently executed process in processor 1, while register 132 holds the number of an instruction segment storing an instruction code for a currently executed module in the process. On the other hand, register 601 corresponds to both registers 133 and 134 in FIG. 2. Preset in register 601 are a virtual space number of a specific process which can access the shared memory area on main memory 3 and a number of an instruction segment storing an instruction code for a specific module in the process. Check circuit 602 corresponds to comparators 135, 136 and AND circuit 137 in FIG. 2, and outputs cache control scheme directing bit 138 of logical one which directs the store-through scheme cache control protocol when a currently executed module in a process in processor 1 is a preset module in a process, and when otherwise outputs logical zero which directs the store-in scheme cache control protocol.

Cache control scheme directing bit 138 outputted from check circuit 602 is set in register 606 via selector 605 together with request address 603 and request command 604 for a cache when a memory request is generated in processor 1.

Information in register 606 is used for search of cache memory 11 and for control with cache control unit 12. The search of cache memory 11 is performed using address array 607 for holding a copy of an address on main memory 3 for each cache block stored in cache memory 11. Address array 607 also stores a cache state bit for indicating whether each cache block state is Invalid, Shared, or Dirty, which bit is referred to by cache control unit 12.

Cache control unit 12 performs control with the store-through scheme cache control protocol if a value of a cache control scheme directing bit in register 606 is one, and performs operations and state transition described with reference to FIG. 4 for the cache block indicated by a request address in register 606 in accordance with the request command in register 606. At this point, the information stored in register 606 is outputted to system bus 4 over signal line 608 and then notified to main memory control unit 5 and to cache control unit 22 in the other processor 2 via system bus 4. A cache block read from cache memory 11 in accordance with the information in register 606 is outputted to system bus 4 over signal line 609 in accordance with the operations described in FIG. 4, and then transferred to main memory control unit 5 and to cache control unit 22 in the other processor 2 via system bus 4 if it needs to be transferred to main memory 3 or to cache memory 21 in the other processor 22. If the cache block does not need to be transferred to main memory 3 or to the cache in the other processor 2, it is transferred to an operational unit in processor 1 over signal line 610.

On the other hand, if a cache control scheme directing bit of register 606 is logical zero, cache control unit 12 performs control with the store-in scheme cache control protocol, and performs operations and state transition described in FIG. 3 for the cache block indicated by the request address in register 606 in accordance with the request command in register 606. Information held in register 606 and a cache block read from cache memory 11 are outputted to system bus 4 over signal lines 608, 609, respectively, as required, in accordance with operations described in FIG. 3, and then notified to main memory control unit 5 and to cache control unit 22 in the other processor 2 via system bus 4. The cache block is transferred to an operational unit in processor 1 over signal line 610.

A request for a cache block from the other processor comprises a request address, a request command for a cache, and a cache control scheme directing bit, similarly to information in register 606., and is received by signal line 611 via system bus 4 and then stored in buffer 612 controlled with FIFO. The request stored in buffer 612 from the other processor is subsequently stored in register 606 with FIFO control via signal line 613 and selector 605, and is subjected to access by cache memory 11 and cache control with cache control unit 12.

Figure 7:
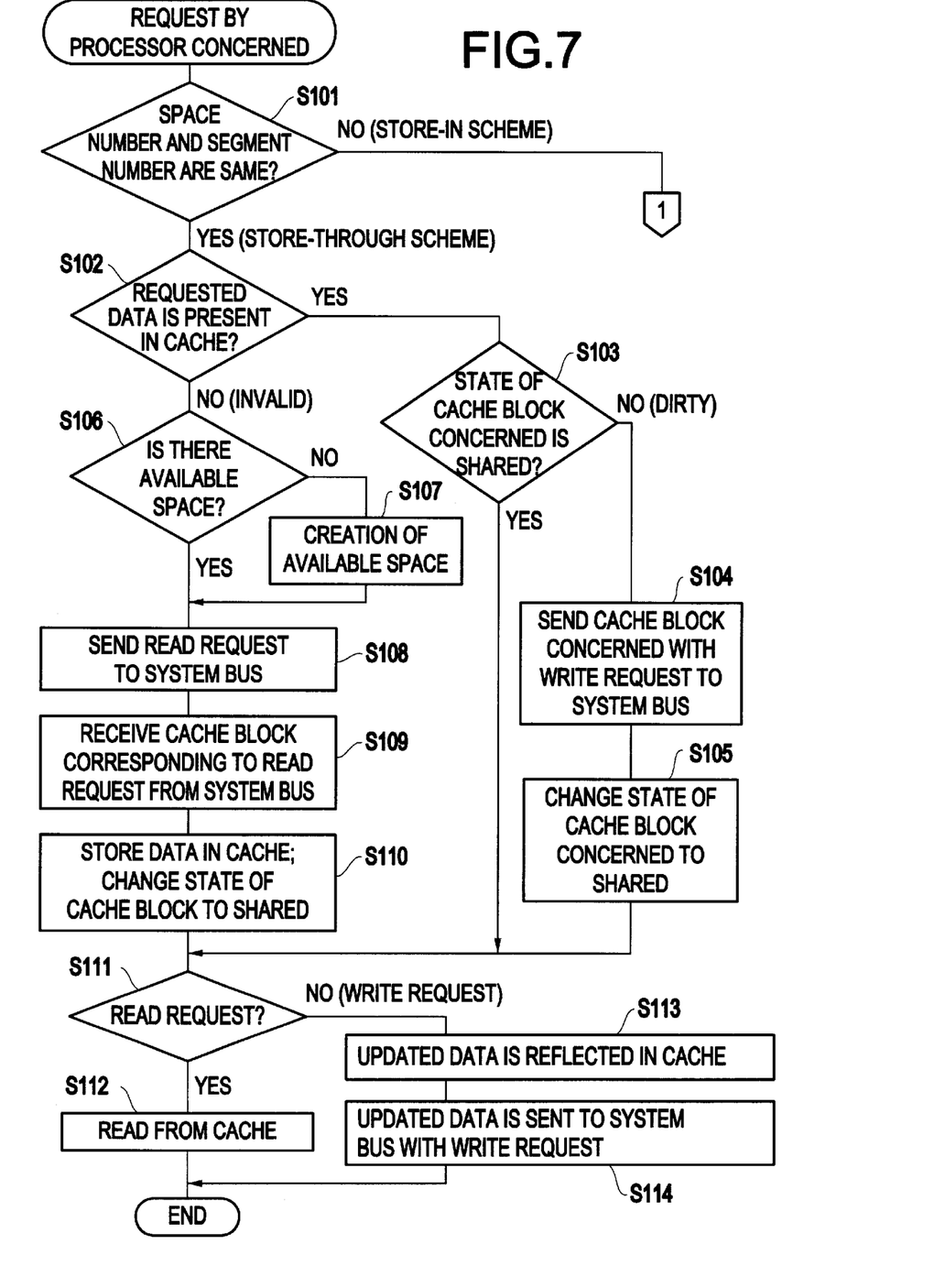
FIG. 7 is a flow chart showing an example of processing with a processor.
Figure 8:
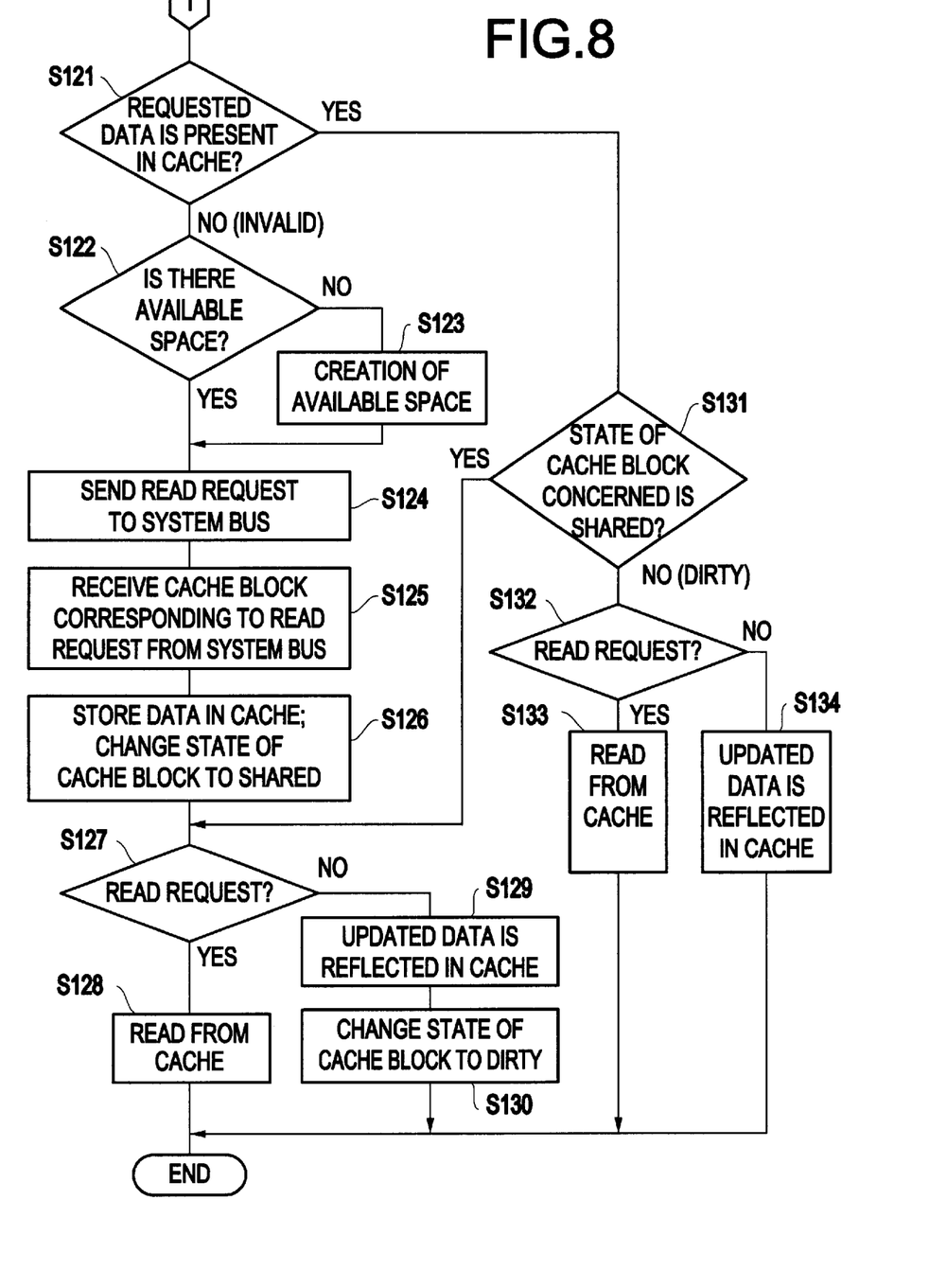
FIG. 8 is a flow chart continuing to step 101 in in FIG. 7.

FIG. 7 and FIG. 8 are flow charts showing an example of processing with a processor according to the present invention. The operation in the embodiment will be hereinafter described with a focus put on processor 1.

In processor 1, when an access to memory data occurs in a module in a process, a check is made to determine whether the module in a processor which issued such a request for the memory access is a module in a process preset in register 601, i.e. whether virtual space numbers and instruction segment numbers match between both modules in check circuit 602 (S101). If the virtual space numbers and instruction segment numbers match, a cache control directing bit of logical one for directing the store-through scheme is set in register 606, in addition to request address 603 and request command 604, to perform control in accordance with the store-through scheme cache control protocol. If the virtual space numbers or instruction segment numbers do not match, a cache control directing bit of logical zero for directing the store-in scheme is set in register 606, in addition to request address 603 and request command 604, to perform control in accordance with the store-in scheme cache control protocol.

(1)Store-through Scheme

Cache control unit 12 checks whether requested data is present in cache memory 11 (S102). If a hit is found in the cache (YES at S102), cache control unit 12 determines whether the state of the hit cache block is Shared or Dirty (S103). If Shared (YES at 103), and in the case of a read request (YES at 111), data is read from the cache block and returned (S112). In this case, the state of the cache block remains Shared ((11) in FIG. 4). In the case of a write request (NO at S111), updated data is reflected in the cache block (S113). Since this processing is performed in the store-through scheme, the updated data is sent to system bus 4 with a write request (with an accompanying cache control scheme directing bit of 1) (S114) to update main memory 3 and a copy of cache memory 21 of the other processor 2. In this case, the state of the cache block in processor 1 remains Shared ((11) in FIG. 4). On the other hand, processor 2, upon receiving the write request sent from processor 1 to system bus 4 at S114, updates a copy of a pertinent cache block, if it holds it ((11) in FIG. 4). Main memory control unit 5 also updates pertinent data on main memory 3 in response to the write request.

If the state of the hit cache block is Dirty (NO at S103), cache control unit 12 first sends the cache block with a write request (with an accompanying cache control scheme directing bit of 1) to system bus 4 (S104) and changes the state of the cache block to Shared in accordance with state transition (12) in FIG. 4 (S105). At this point, main memory control unit 5 updates a data block corresponding to the cache block on main memory 3 in accordance with the write request. Next, in the case of a read request (YES at S111), cache control unit 12 reads data from the cache block and returns it (S112). In the case of a write request (NO at S111), it reflects updated data in the cache block (S113), and sends the updated data to system bus 4 with a write request (with an accompanying cache control scheme directing bit of 1) (S114) to update main memory 3 since this processing is performed in the store-through scheme.

On the other hand, when a hit is not found in the cache (NO at S102), a check is made whether there is an available space for reading a new cache block in cache memory 11 (S106). After an available space is created (S107) if there is no available space (NO at S106), or immediately if there is an available space (YES at S106), a read request (with an accompanying cache control scheme directing bit of 1) for a cache block including requested data is sent to system bus 4 (S108). In response to this read request, main memory control unit 5 sends the newest value of the cache block to system bus 4 if main memory 3 holds it, and changes the state of a data block corresponding to the cache block in main memory 3 to Shared. If the newest value is not possessed by main memory 3 but possessed by the other processor 2, processor 2 sends the requested cache block to system bus 4 in response to the read request, and changes the state of the cache block in processor 2 to Shared ((12) in FIG. 4) in accordance with the state transition in FIG. 4. At this point, main memory control unit 5 updates a pertinent data block in main memory 3 corresponding to the cache block sent from processor 2 to system bus 4.

Next, cache control unit 12 receives the cache block corresponding to the read request issued at S108 from system bus 4 (S109), then stores the data in the available space of cache memory 11 and changes the state of the cache block to Shared (S110) in accordance with the state transition (14) in FIG. 4. If the request is a read request (YES at S111), data is read from the cache block and returned (S112). If the request is a write request (NO at S111), updated data is reflected in the cache block (S113), and the updated data is sent to system bus 4 (S114) with a write request (with an accompanying cache control scheme directing bit of 1).

In the processing for creating an available space at S107, the following processing is performed, for example. Cache control unit 12 selects one cache block to be written back in accordance with a known algorithm such as an LRU. Next, if the state of the selected cache block is Invalid, the area in which the cache block has been stored is made into an available space. If the state of the selected cache block is Dirty, the contents of the cache block is written back to main memory 3 via system bus 4, the state of a pertinent data block in main memory 3 is changed to Dirty, and the area in which the cache block has been stored is made into an available space. If the state of the selected cache block is Shared, a notification is provided to main memory control unit 5 via system bus 4 to change the state of a pertinent data block to Dirty, and the area in which the cache block has been stored space is made into an available space.

(2)Store-in Scheme

Cache control unit 12 checks whether requested data is present in cache memory 11 (S121). If a hit is found (YES at S121), cache control unit 12 determines whether the state of the hit cache block is Shared or Dirty (S131). If Shared (YES at 131), and in the case of a read request (YES at 127), data is read from the cache block and returned (S128). In this case, the state of the cache block remains Shared ((1) in FIG. 3). In the case of a write request (NO at S127), updated data is reflected in the cache block (S129). Since this processing is performed in the store-in scheme, the state of the cache. block is changed to Dirty (S130) in accordance with the state transition (2) FIG. 3. At S130, the write request is notified to main memory control unit 5 and to the other processor 2 via system bus 4, main memory control unit 5 changes the state of a pertinent data block, if it is Shared, to Invalid, and processor 2 changes the state of a pertinent cache block, if it is Shared, to Invalid in. accordance with the state transition (3) in FIG. 3.

If the state of the hit cache block is Dirty (NO at S131), and in the case of a read request (YES at S132), cache control unit 12 reads data from the cache block and returns it (S133). In the case of a write request (NO at S132), it reflects updated data in the cache block (S134). Since the processing is performed in the store-in scheme, no writing back to main memory 3 is performed. In either case, no transition occurs in the state of the cache block ((5) in FIG. 3).

On the other band, when a hit is not found in the cache (NO at S121), cache control unit 12 checks whether cache memory 11 has an available space for reading a new cache block (S122). After an available space is created similarly to S107 (S123) if there is no available space (NO at S122), or immediately if there is an available space (YES at S122), a read request (with an accompanying cache control scheme directing bit of 0) for a cache block including requested data is sent to system bus 4 (S124). In response to this read request, main memory control unit 5 sends the newest value of the cache block to system bus 4 if main memory 3 holds it, and changes the state of a data block corresponding to the cache block in main memory 3 to Shared. If the newest value is not possessed by main memory 3 but possessed by the other processor 2, processor 2 sends the requested cache block to system bus 4 in response to the read request, and changes the state of the cache block in processor 2 to Shared in accordance with the state transition in FIG. 3 ((4) in FIG. 3). At this point, main memory control unit 5 updates a data block in main memory 3 corresponding to the cache block sent from processor 2 to system bus 4.

Next, cache control unit 12 receives the cache block corresponding to the read request issued at S124 from system bus 4 (S125), then stores the data in the available space of cache memory 11 and changes the state of the cache block to Shared (S126). If the request is a read request (YES at S127), data is read from the cache block and returned (S128). In this case, the state of the cache block is eventually Shared ((8) in FIG. 3). If the request is a write request (NO at S127), updated data is reflected in the cache block (S129), and the state of the cache block is changed to Dirty in accordance with the state transition (7) in FIG. 3 (S130). At S130, as described above, the write request is notified to main memory control unit 5 and to the other processor 2 via system bus 4, and main memory control unit 5 changes the state of a pertinent data block, if it is Shared, to Invalid, and processor 2 changes the state of a pertinent cache block, if it is Shared, to Invalid in accordance with the state transition (3) in FIG. 3.

As described above, according to the present invention, cache control protocols are not switched by detecting an area to be accessed, but switched by detecting whether a software module which attempts to access stored data is a software module present for accessing a shared memory area on a main memory, thereby allowing switching of cache control protocols during running without changing an architecture for a segment descriptor or page descriptor for indicating an attribute of an area to be accessed.

Additionally, only a small amount of information need be preset such as a virtual space number and an instruction segment number for specifying a software module which accesses a shared memory area on a main memory, and it is possible to significantly simplify prior processing as compared with the prior art in which control information must be set for each of a large number of segment descriptors or page descriptors.

Although a certain preferred embodiment of the present invention has been shown and described in detail, it should be understood that various changes and modifications may be made therein without departing from the scope of the appended claims.

What is claimed is:

1. A multiprocessor system comprising:
    a plurality of processors each including a cache memory and accessing stored data via said cache memory;
    a main memory shared among said plurality of processors;
    a module detecting device possessed by each of said processors for detecting execution of a software module for accessing a shared memory area on said main memory; and
    an access control device possessed by each of said processors for controlling memory access executed in response to an accessing software module identifier detected by said module detecting device in a cache control protocol in a store-through scheme which updates said main memory simultaneously with update of said cache memory or for controlling memory access in other than said detection case in a cache control protocol in a store-in scheme which does not update said main memory at update of said cache memory, wherein said module detecting device comprises a first virtual space number register and a first instruction segment number register in which virtual space number of software modules in all processes which can access said shared memory area on said main memory and numbers of instruction segments storing instruction codes for said software modules are preset respectively, a second virtual space number register and a second instruction segment number register for respectively holding a virtual space number and a number of an instruction segment storing an instruction code for a software module which attempts to access the stored data via said cache memory, first and second comparators for comparing the virtual space numbers and the numbers of instruction segments stored in said four respective registers, and a logical circuit for detecting whether a match is detected in both said first and second comparators.

2. The multiprocessor of claim 1, wherein said accessing software module identifier comprises a virtual space number set for a process which is making a memory access.

* * * * *